Nov. 22, 1927.
H. J. DODDS
1,650,115
MECHANISM FOR RENDERING VEHICLE HEADLIGHTS DIRIGIBLE
Filed Aug. 12, 1926
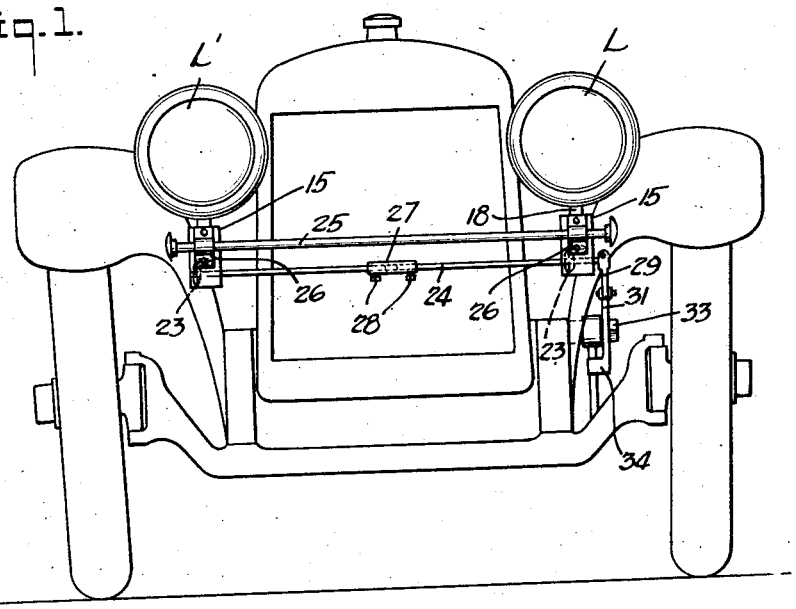
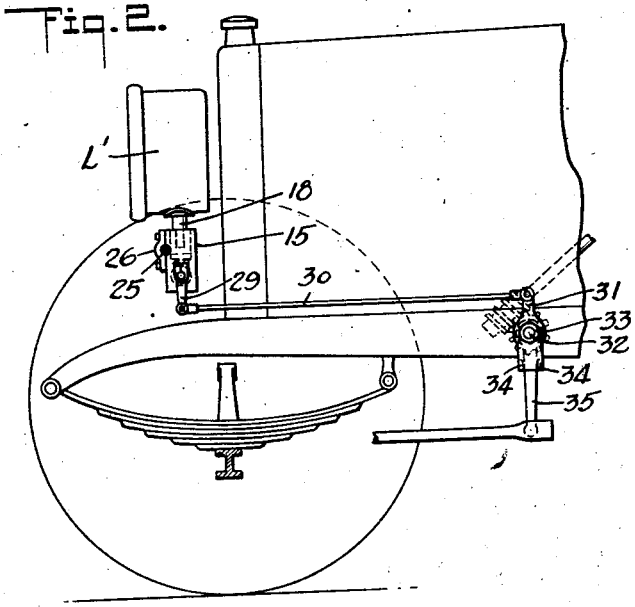
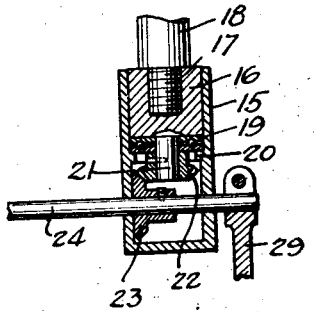
INVENTOR.
HOMER J. DODDS
BY *Munn & Co.*
ATTORNEYS.

Patented Nov. 22, 1927.

1,650,115

UNITED STATES PATENT OFFICE.

HOMER J. DODDS, OF PASADENA, CALIFORNIA.

MECHANISM FOR RENDERING VEHICLE HEADLIGHTS DIRIGIBLE.

Application filed August 12, 1926. Serial No. 128,887.

My invention relates to dirigible headlights for motor vehicles, and a purpose of my invention is the provision of a simple, inexpensive and durable mechanism capable of being readily attached to any of the present forms of motor vehicles without in any way modifying the construction of the vehicles, and when applied successfully operating to move the headlights in accordance with the movement of the front wheels of the vehicle.

I will describe only one form of mechanism for rendering headlights of motor vehicles dirigible embodying my invention, and will then point out the novel features thereof in claims.

In the drawings

Figure 1 is a view showing in front elevation a conventional form of motor vehicle having applied thereto one form of mechanism embodying my invention;

Figure 2 is a view showing the mechanism in side elevation and in applied position to a motor vehicle;

Figure 3 is an enlarged fragmentary sectional view of that part of the mechanism for supporting the left hand headlight.

Referring specifically to the drawings, in which similar reference characters refer to similar parts in each of the views, my invention in its present embodiment comprises a pair of supports by which a pair of headlights L and L' are mounted for rotational movement in either direction, and as the construction of these two supports is identical a description of one will suffice for both. As illustrated to advantage in Figure 3, the support for the headlight L comprises a cup shaped casing 15 in the upper end of which is rotatably fitted a head 16 recessed and interiorly threaded to receive a reduced extension 17 of a bracket 18 upon which the lamp L is secured. The head 16 is rotatably supported within the casing 15 by a thrust bearing 19 and the latter in turn is supported in elevated position within the casing by an annular flange 20 formed interiorly of the casing. A stub shaft 21 is fixed to the lower end of the head 16, and keyed to the stub shaft is a miter pinion 22 which constantly meshes with a similar pinion 23 fixed to a shaft 24 rotatable in the casing 15 and extending completely therethrough. As shown in Figure 1, the other end of the shaft 24 extends into the casing 15 of the support for the lamp L' and is here provided with a similar pinion 23 which meshes with the pinion 22 in the same manner as the pinions for the support just described. It will thus be seen that the shaft 24 provides an operative connection between the supports for the lamps L and L' and through the several pinions rotation of the shaft 24 causes rotation of the lamps L and L' in one direction or the other, depending upon the direction of rotation of the shaft 24.

As shown in Figures 1 and 2, the casings 15 are recessed at corresponding points on their front sides to accommodate the usual lamp supporting rod 25, and clamping plates 26 are bolted to the casings 15 to firmly secure the casings to the supporting rod. To facilitate assembling, the shaft 24 is made in two sections as illustrated in Figure 1, with the confronting ends of the sections connected by a sleeve 27 having set screws 28 for locking the ends of the shaft sections within the sleeve and thereby operatively connecting the two sections.

As shown in Figure 3, one end of the shaft 24 projects from the corresponding casing 15 and has secured thereto the upper end of an arm 29, the lower end of the arm being pivotally connected to a rod 30 which extends rearwardly beneath the adjacent fender and above the frame of the vehicle for pivotal connection at its rear end to the upper end of an arm 31. This arm 31 is applied to the usual stub shaft 32 of a conventional steering mechanism, and the arm is secured to the stub shaft by means of the usual nut 33 threaded on the end of the stub shaft. However, to prevent accidental independent movement of the arm 31 in respect to the stub shaft, the arm is provided with a pair of spaced flanges 34 which engage the opposite edges of the usual steering arm 35, and as the arm is locked to the stub shaft it will be clear that the arm aids in insuring movement of the arm 31 with the stub shaft. In this manner the shaft 24 is operatively connected to the steering mechanism so as to be actuated thereby and to be rotated in one direction or the other, depending upon the direction of rotation of the stub shaft.

In practice, rotation of the shaft 24 effects rotation of the brackets 18 through the medium of the miter pinions 22 and 23, thereby rotating the lamps L and L' simultaneously and in one direction or the other in accordance with the steering movements of the front wheels of the vehicle, whereby the lamps are automatically caused to define the steering movements of the front wheels and thereby illuminate the road in advance of the vehicle, particularly when making turns.

Although I have herein shown and described only one form of mechanism for rendering headlights for motor vehicles dirigible embodying my invention, it is to be understood that various changes and modifications may be made therein without departing from the spirit of the invention, and the spirit and scope of the claims hereto appended.

I claim:

1. A mechanism for rendering vehicle headlights dirigible, comprising a pair of supports for the headlights of a vehicle, each support including a casing, a head rotatable in the casing and fixed to the supporting bracket for the lamp, a shaft extending into both of the casings and having gear connections with said heads to rotate the heads, means by which the casings are adapted to be secured to the lamp supporting rod of the vehicle, an arm fixed to the shaft, a second arm adapted to be fixed to the stub shaft of the steering mechanism so as to be rotated thereby, and a connecting rod between the two arms for transmitting the rotative movement of the stub shaft to said shaft, said second arm having flanges adapted to engage the steering arm of the steering mechanism to insure rotation of the second arm with the stub shaft.

2. A mechanism for rendering vehicle headlights dirigible, comprising a pair of supports for the headlights of a vehicle, each support including a cup shaped casing adapted to be secured to the headlight supporting rod and having an annular flange interiorly thereof intermediate its ends, a head to which the headlight is adapted to be secured rotatably mounted in said casing upon said flange and having its lower end extending below said flange and reduced to provide a stub shaft, an operating shaft extending into both of said casings below said flanges and having gear connections with said stub shafts to rotate said heads, and means secured to said operating shaft and adapted for operative connection with the steering mechanism of the vehicle by which the heads are caused to be simultaneously rotated in accordance with the steering movements of the steering mechanism.

HOMER J. DODDS.